United States Patent [19]

Hendrich et al.

[11] Patent Number: 4,664,873
[45] Date of Patent: May 12, 1987

[54] SYSTEM FOR PERFORMING REMOTELY-CONTROLLED MANUAL-LIKE OPERATIONS IN LARGE-AREA CELL OF A NUCLEAR FACILITY

[75] Inventors: Klaus Hendrich, Seelze; Horst Halm, Dortmund; Klaus Blaseck, Burgdorf; Lothar Hoffmeister, Hanover, all of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 486,437

[22] Filed: Apr. 19, 1983

[30] Foreign Application Priority Data

May 3, 1982 [DE] Fed. Rep. of Germany ....... 3216352

[51] Int. Cl.⁴ ............................................. G21C 19/00
[52] U.S. Cl. ................................. 376/260; 212/209; 212/213; 212/224; 414/8; 901/1; 901/5
[58] Field of Search ................ 212/205, 209, 213, 224; 414/5, 8, 751, 753; 376/245, 248, 249, 251, 260, 261, 262, 264, 268; 901/1, 5

[56] References Cited

U.S. PATENT DOCUMENTS

| | | | |
|---|---|---|---|
| 2,822,094 | 2/1958 | Greer | 212/213 |
| 2,848,404 | 8/1958 | Treshow | 376/245 |
| 2,978,118 | 4/1961 | Goertz et al. | 901/1 |
| 3,888,362 | 6/1975 | Fletcher et al. | 414/753 |
| 3,961,712 | 6/1976 | Bartley | 212/209 |
| 4,196,049 | 4/1980 | Burns et al. | 376/249 |
| 4,439,905 | 4/1984 | Gourdon et al. | 212/213 |
| 4,526,311 | 7/1985 | Schröder | 29/723 |

FOREIGN PATENT DOCUMENTS

| | | | |
|---|---|---|---|
| 1139256 | 11/1962 | Fed. Rep. of Germany | 212/205 |
| 3244418 | 9/1983 | Fed. Rep. of Germany | 376/260 |
| 1245618 | 10/1960 | France | 376/248 |
| 0568214 | 9/1977 | U.S.S.R. | 376/248 |

OTHER PUBLICATIONS

Mechanical Engineering, vol. 94, #5, May 1972, p. 49.
Proceedings of 23rd Conference on Remote Systems Technology, Clinch River Breeder Reactor Project Fuel Handling System, 1975, pp. 415–423.

Primary Examiner—Deborah L. Kyle
Assistant Examiner—Richard W. Wendtland
Attorney, Agent, or Firm—Walter Ottesen

[57] ABSTRACT

The invention is directed to remotely-controlled manipulator carrier systems for use in maintaining and servicing process equipment housed in large-area cells affected by radioactivity wherein industrial processes are conducted. The cells are part of a nuclear facility for reprocessing irradiated nuclear fuel materials. The process equipment is arranged along mutually adjacent walls of the cell and so defines a canyon-like passageway extending in the direction of the longitudinal axis of the cell. The system includes a first overhead bridge crane having a trolley movable thereon in a direction transverse to said longitudinal axis. The trolley includes a hoist for lowering and raising a hook for engaging and moving a component of the process equipment in a first vertical plane transverse to said axis. A second overhead bridge crane is disposed beneath the first bridge crane. Tracks are provided for guiding the bridge cranes in the enclosure in respective horizontal planes and in the direction of said longitudinal axis. The second overhead bridge crane includes an elongated supporting member arranged transversely to said axis above the passageway and engaging the track for movement therealong. A manipulator assembly includes a mast connected to the elongated supporting member and extends downwardly into the canyon-like passageway from the supporting member. The supporting member and the mast conjointly define a second vertical plane transverse to said axis. The manipulator assembly further includes a manipulator or performing manual-like operations on the process equipment, the manipulator being mounted asymmetrically on the mast so as to be on one side thereof and in a third vertical plane transverse to said axis. The first bridge crane is movable along the track to bring the first vertical plane into coincidence with the third vertical plane so as to permit movement of the hook in the third vertical plane clear of the transverse elongated supporting member whereby both the manipulator and the hook can be brought simultaneously to a predetermined work location at the process equipment.

6 Claims, 9 Drawing Figures

SYSTEM FOR PERFORMING REMOTELY-CONTROLLED MANUAL-LIKE OPERATIONS IN LARGE-AREA CELL OF A NUCLEAR FACILITY

FIELD OF THE INVENTION

The invention relates to remotely-controlled manipulator carrier systems for use in large-area cells affected by radioactivity wherein industrial processes are conducted. The cells are part of a nuclear facility for reprocessing irradiated nuclear fuel materials. The cell is defined by an enclosure and a remotely-controlled bridge crane is arranged beneath the ceiling of the enclosure. The bridge crane includes a vertical, rotatable guide column mounted on a supporting member arranged above the process components in the cell. A support is movably mounted on the guide column for vertical movement and an extendible arm is arranged on this support. The extendible arm is adapted to receive a manipulator or other remotely-controlled device to perform manual-like maintenance operations on the process components and equipment arranged in the large-area cell.

BACKGROUND OF THE INVENTION

Facilities for the reprocessing of irradiated nuclear fuel materials are equipped with so-called hot cells for holding the components needed for conducting the industrial processes associated therewith. In these radiation-shielded cells, the process components are arranged in scaffold-like structures or racks as they are sometimes referred to.

The maintenance work within the hot cell affected by radioactive radiation should be conducted preferably without the necessity of operating personnel entering the hot cell. Solutions have been therefore sought to conduct the maintenance work by means of remotely-controlled equipment which can be movable within the hot cell. For this purpose, it is desirable that the racks holding the components used in the industrial processes be arranged in mutually adjacent rows longitudinally along the walls of the hot cell. In this way, a center passageway is formed along which the remotely-controlled equipment for the maintenance work can be moved and for exchanging the individual process components or exchanging fully-loaded racks.

For the maintenance work and the exchange of individual process components or of entire racks, a combination of remotely-controlled machines for performing manual-like operations are utilized. The overhead bridge crane passes over both rows of racks and the center passageway. After all connections and conduits are disconnected, the racks or heavy individual components are lifted from their anchor locations with the aid of the overhead bridge crane. The bridge crane then moves the racks or individual components horizontally into the transport passageway. The control room for the remotely-controlled bridge crane is located outside of the hot cell.

In addition to the overhead bridge crane, a manipulator carrier apparatus is provided which can act in the horizontal direction from the central transport passageway to engage the process components and to position operating devices, maintenance device and tools. This manipulator carrier apparatus opens up the possibility for utilizing electrical servo and power manipulators as well as providing the capability for the future use of robots and programmed apparatus. Manual-like operations are performed on small components with the available manipulators and lifting devices in dependence upon the configuration of the carrier apparatus.

The manipulator carrier apparatus includes a vertical guide column arranged on a second overhead bridge crane movable below the first overhead bridge crane in the direction of the longitudinal axis of the hot cell; or, if desired, the column can be mounted on a half bridge movable below the overhead bridge crane. The rotatable guide column includes an extendable arm mounted on a support which can be moved vertically up and down. The extendable arm is adapted to receive the tools or equipment for performing manual-like operations. A division of work is achieved with the arrangement of the first overhead bridge crane and the manipulator carrier apparatus. The remotely-controlled first overhead bridge crane is used primarily for holding and transporting pipe connections, components and individual racks. If necessary, the first overhead bridge crane can take over the lowering and holding of tools as well as separating and welding equipment. The manipulator carrier apparatus which is movable along the central passageway serves to guide and hold impact wrenches or other special tools which are needed to effect disassembly work. Further, the manipulator carrier apparatus and second overhead bridge crane can be adapted for accommodating video equipment or other helpful ancilliary devices.

SUMMARY OF THE INVENTION

It is an object of the invention to provide an arrangement to improve the utilization of the remotely-controlled equipment so that both the first overhead bridge crane and the manipulator carrier apparatus can be brought to work at the same location simultaneously.

The system of the invention performs remotely-controlled, manual-like operations in a large-area hot cell of a facility for reprocessing irradiated fuel materials. The hot cell is an enclosure with process equipment disposed along at least one longitudinally extending wall thereof whereby a canyon-like passageway is defined which extends in the direction of the longitudinal axis of the enclosure. The system of the invention includes a first overhead bridge crane having a trolley movable thereon in a direction transverse to said longitudinal axis. The trolley includes hoist means for lowering and raising a device for engaging and moving a component of the process equipment in a first vertical plane transverse to the axis. A second overhead bridge crane is disposed beneath the first overhead bridge crane. Elevated track means guides the first and second bridge cranes in the enclosure in respective horizontal planes and in the direction of the longitudinal axis. The second overhead bridge crane includes an elongated supporting member arranged transversely to the longitudinal axis of the enclosure above the passageway and engages the track means for movement therealong. A manipulator assembly has a mast that extends downwardly into the canyon-like passageway from the supporting member. The supporting member and the mast conjointly define a second vertical plane transverse to the longitudinal axis of the enclosure. The manipulator assembly further includes manipulator means for performing manual-like operations on the process equipment and is mounted asymmetrically on the mast so as to be on one side thereof and in a third vertical plane transverse to the longitudinal axis of the enclosure. Means are provided for moving the first overhead bridge crane along the track means to bring the first vertical plane into coincidence with the third vertical plane so as to permit movement of the engaging device in the third vertical plane clear of the elongated supporting member whereby both the manipulator means and the engaging device can be brought simultaneously to a predetermined work location at the processing equipment.

During maintenance work involving both the first overhead bridge crane for lifting and holding a component of the process equipment and the manipulator carrier apparatus made up of the above-mentioned manipulator assembly and second overhead bridge crane, the execution of manual-like movements by the manipulator assembly and the lifting movement of a component of the process equipment by the first overhead bridge crane at the same work location do not interfere with each other. The guide column or mast and the hoist cable of the first overhead bridge crane are displaced with respect to each other and are in two different vertical planes of the hot cell.

BRIEF DESCRIPTION OF THE DRAWING

The invention will now be explained with reference to the drawing wherein.

DESCRIPTION OF THE PREFERRED EMBODIMENTS OF THE INVENTION

Figure 1:
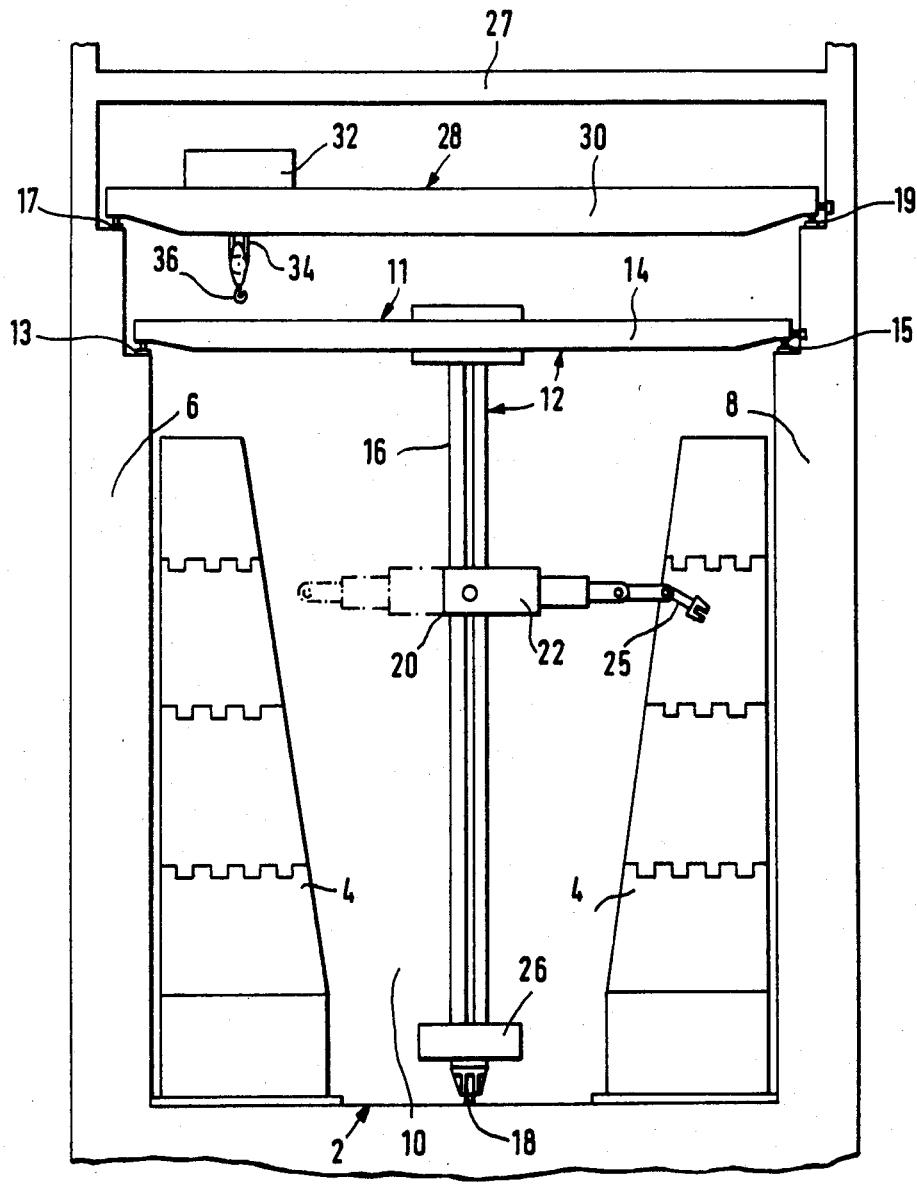
FIG. 1 is an elevation view of a large-area hot cell equipped with an embodiment of the system of the invention for performing remotely-controlled operations on process equipment contained in the hot cell.

Referring to FIG. 1, a large-area hot cell 2 contains several racks disposed along mutually-adjacent walls 6 and 8. These racks 4 are provided with an indexed structure and contain the process components (not shown) which are to be maintained by the system according to the invention. The mutually-adjacent rows of racks conjointly define a canyon-like transport passageway 10 along which a manipulator assembly 12 can be moved are accommodated.

The manipulator assembly 12 is connected to an elongated supporting member in the form of a transverse beam 14 of an overhead bridge crane which can be moved along rails 13 and 15 disposed in respective sidewalls 6 and 8. A vertical guide column or mast 16 is coupled to the beam 14 and has a roller assembly 18 at its lower end for engaging the floor of the hot cell.

The mast 16 is rotatable about its longitudinal axis and a support 20 is mounted thereon. The support is mounted so as to be movable up and down the mast 16. The support carries a telescopically-extendable arm 22 mounted thereon asymmetrically with respect to the column. At the end of the telescopically-extendable arm 22, a manipulator, tools or other remotely-controlled manipulating device is provided.

Figure 2:
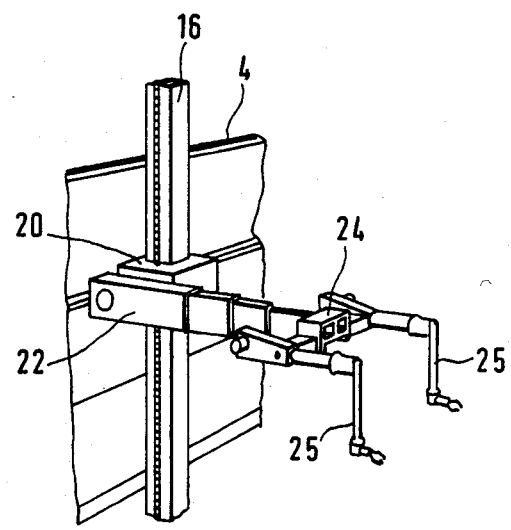
FIG. 2 is a perspective view of a portion of the guide mast of the manipulator assembly showing an extendible arm mounted asymmetrically on the mast.

In the schematic representation of FIG. 2, the manipulator is shown as a master slave device 24 with two slave arms 25. At the lower end, the mast 16 carries a tool table 26. A remotely-controlled overhead bridge crane 28 is arranged above the bridge crane of beam 14 and multiplator assembly 12. The bridge crane 28 is disposed just beneath the ceiling wall 27 of the hot cell. The bridge crane 28 is guided by and can be moved along rails 17 and 19 mounted in respective walls 6 and 8. The rails 13, 15 and 17, 19 constitute elevated track means for guiding the respective overhead bridge cranes 11 and 28 in the hot cell and in the direction of the longitudinal axis thereof.

The bridge crane 28 includes a trolley 32 movable along the beam 30. The trolley 32 includes hoist means comprising an engaging device in the form of a crane hook 36 at the end of a hoist 34. The crane hook 36 is movable in the vertical direction and with aid of the hoist means of trolley 32. The crane hook 36 can be also moved in the horizontal direction by moving the trolley 32 along the beam 30.

Figure 3:
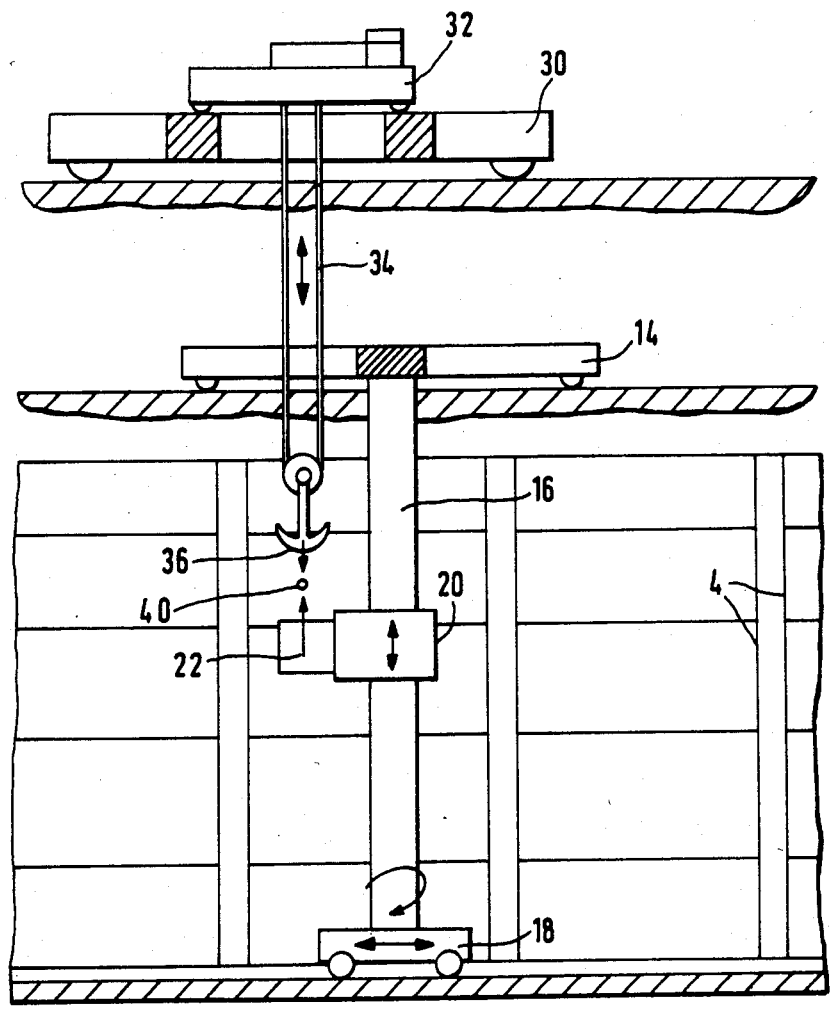
FIG. 3 is a side elevation view of the system of the invention taken at a longitudinal section through the hot cell; this view shows the extendible arm and engaging device of the hoist assembly of the first overhead bridge crane acting at the same location.

The cooperative relationship between the overhead bridge crane 28 and the manipulator carrier apparatus, made up of the bridge crane 14 and manipulator assembly 12, will now be described with reference to FIG. 3 for the situation where they both operate at the same work location 40. At the work location 40, the crane hook 36 lifts a component (not shown) of the process equipment. For this purpose, it is necessary that the crane hook 36 be lowered to the work location 40. A maintenance function is to be performed at the same location 40 with the remotely-controlled apparatus 24 (FIG. 2) on the extendible arm 22 of the manipulator assembly 12. The extendible arm 22 must be brought to the work location in the same vertical plane as the crane hook 36. Because of the asymmetrical arrangement of the extendible arm 22 with respect to the vertical mast 16, the longitudinal vertical axis of the mast 16 lies outside of the vertical working plane so that the crane hook clears the beam 14 of the bridge crane 11. Accordingly, the crane hook 36 is movable in the vertical direction and can pass unobstructed to the work location 40 in the same working plane in which extendible arm 22 is disposed.

Figure 4:
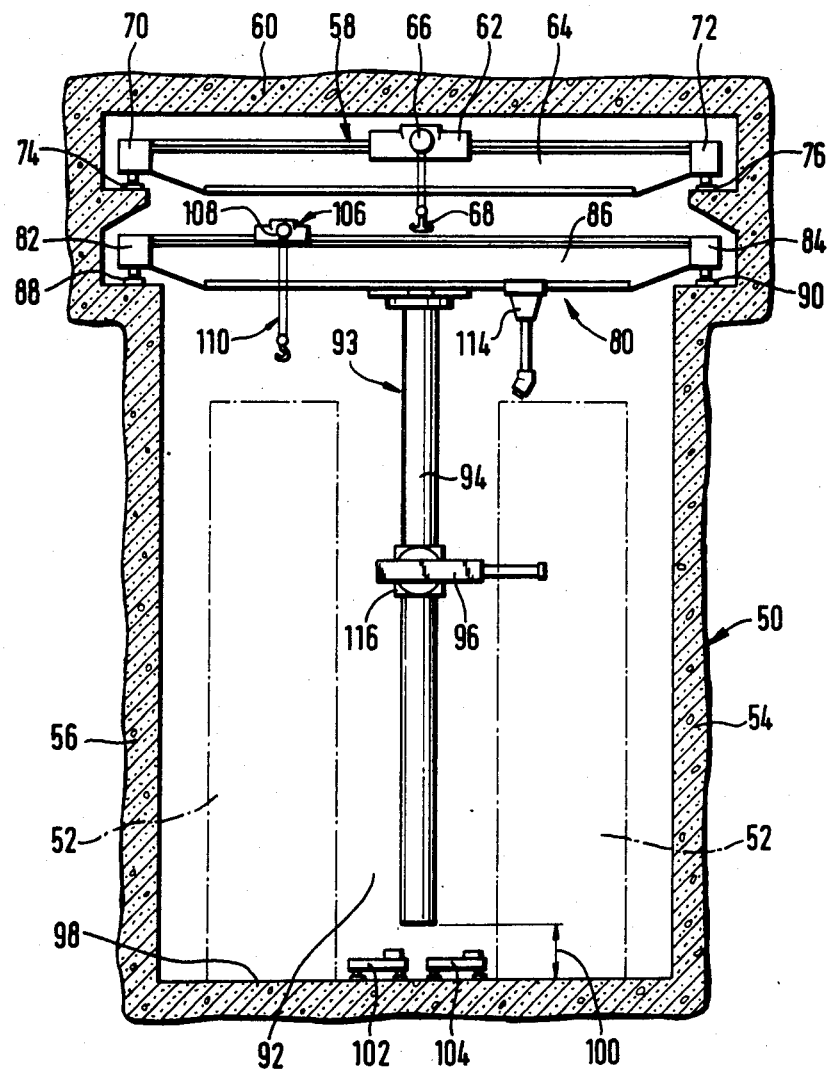
FIG. 4 is an elevation view of the system according to another embodiment of the invention wherein the guide mast is in spaced relationship to the floor of the hot cell.

FIG. 4 discloses another embodiment of the system according to the invention for performing remotely-controlled manual-like maintenance and/or component replacement operations on process equipment contained in racks of a hot cell. FIG. 4 is a section view perpendicular to the longitudinal axis of the hot cell 50. The process equipment is accommodated in racks 52 arranged in two rows along respective vertical walls 54 and 56 of the hot cell.

A first overhead bridge crane 58 is arranged just under the ceiling wall 60 of the hot cell 50 and includes a trolley 62 movable along the horizontal beam 64 of the bridge crane 58. The trolley 62 includes hoist assembly 66 for lowering and raising a device such as a hook 68 for engaging and moving a component of the process equipment in a first vertical plane transverse to the longitudinal axis of the hot cell. End sections 70 and 72 are attached to beam 64 and contain the wheels for engaging respective rails 74 and 76 extending along the length of the hot cell.

An overhead bridge crane 80 is disposed beneath the first overhead bridge crane 58. The bridge crane includes end sections 82 and 84 attached to beam 86 thereof. The end sections 82 and 84 contain wheels for engaging respective rails 88 and 90. The sets of rails (74, 76) and (88, 90) define elevated track means for guiding the first and second bridge cranes in the hot cell in respective horizontal planes and in the direction of the longitudinal axis of the hot cell. Both overhead bridge cranes are arranged so that they pass over the canyon-like passageway 92 and the respective rows of racks 52 of process equipment.

A manipulator assembly 93 includes a mast 94 connected to the elongated beam 86 and extends downwardly into the canyon-like passageway 92 from the beam. The beam 86 and the mast 94 conjointly define a second vertical plane transverse to the longitudinal axis of the hot cell. Manipulator means for performing manual-like operations on the process equipment is provided in the form of a telescopically-extendible arm 96 mounted asymmetrically on the mast 94 so as to be on one side thereof and in a third vertical plane also transverse to the longitudinal axis of the hot cell.

When it is desired to perform a maintenance and/or replacement operation at a predetermined location of the process equipment, the first overhead bridge crane 58 is moved along the rails (74, 76) to bring the above-mentioned first vertical plane into coincidence with the third vertical plane so as to permit movement of the hook 68 by the assembly 66 in the third vertical plane clear of the transverse elongated beam 86 of the second overhead bridge crane 80. In this way, the extendible arm 96 and the hook 68 can be brought simultaneously to the predetermined work location at the purpose equipment. The extendible arm 96 is mounted on a support 116 which is mounted so as to be movable up and down the mast 94.

Still referring to FIG. 4, it is noted that in this embodiment the lower end of the mast 94 is clear of the floor 98 of the hot cell by a distance indicated by a reference numeral 100. This clearance permits two separate trolleys 102 and 104 to pass beneath the mast 94 in the direction of the longitudinal axis of the hot cell. The trolleys 102 and 104 are useful for bringing tools such as impact wrenches for the manipulator means to utilize in its maintenance work on the process equipment. Other uses for the trolleys 102 and 104 include bringing replacement parts into the hot cell and bringing them to a location where they are convenient to the racks 52 where an exchange of components is to be made. The trolleys 102 and 104 are guided by rails embedded in the concrete floor 98.

Figure 5:
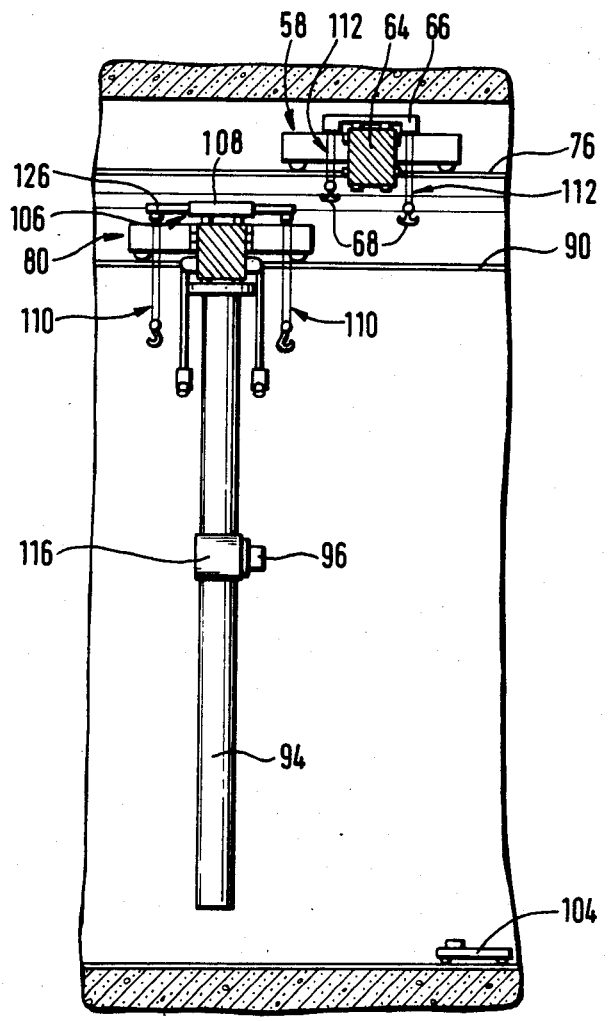
FIG. 5 is a side elevation view showing the manipulator assembly and its overhead bridge crane displaced from the overhead bridge crane for performing the heavy lifting and holding operations.

FIG. 5 is a side elevation view and shows the first overhead bridge crane 58 displaced from the second overhead bridge crane 80 and the manipulator assembly 93 associated therewith. The second overhead bridge crane 80 is equipped with a trolley 106 and a hoist assembly 108. The hoist assembly 108 of the trolley 106 includes a horizontal boom 126 which can be moved in the direction of its longitudinal axis through a predetermined stroke which can be 1.5 meters, for example. The two opposite ends of the boom are provided with block and tackle means 110. This hoist assembly can be used, for example, for small loads up to 500 kilograms on each block and tackle means.

The hoist assembly 66 of the first overhead bridge crane 58 is also equipped with a horizontal boom and respective block and tackle means at respective ends of the boom. The first overhead bridge crane 58 and its hoist assembly 66 are used for moving heavier equipment weighing 20 tons on each of its two block and tackle means 112. Reference numeral 114 indicates a telescopic assembly for accommodating a video camera and/or a lamp for illuminating the work location.

Figure 6:
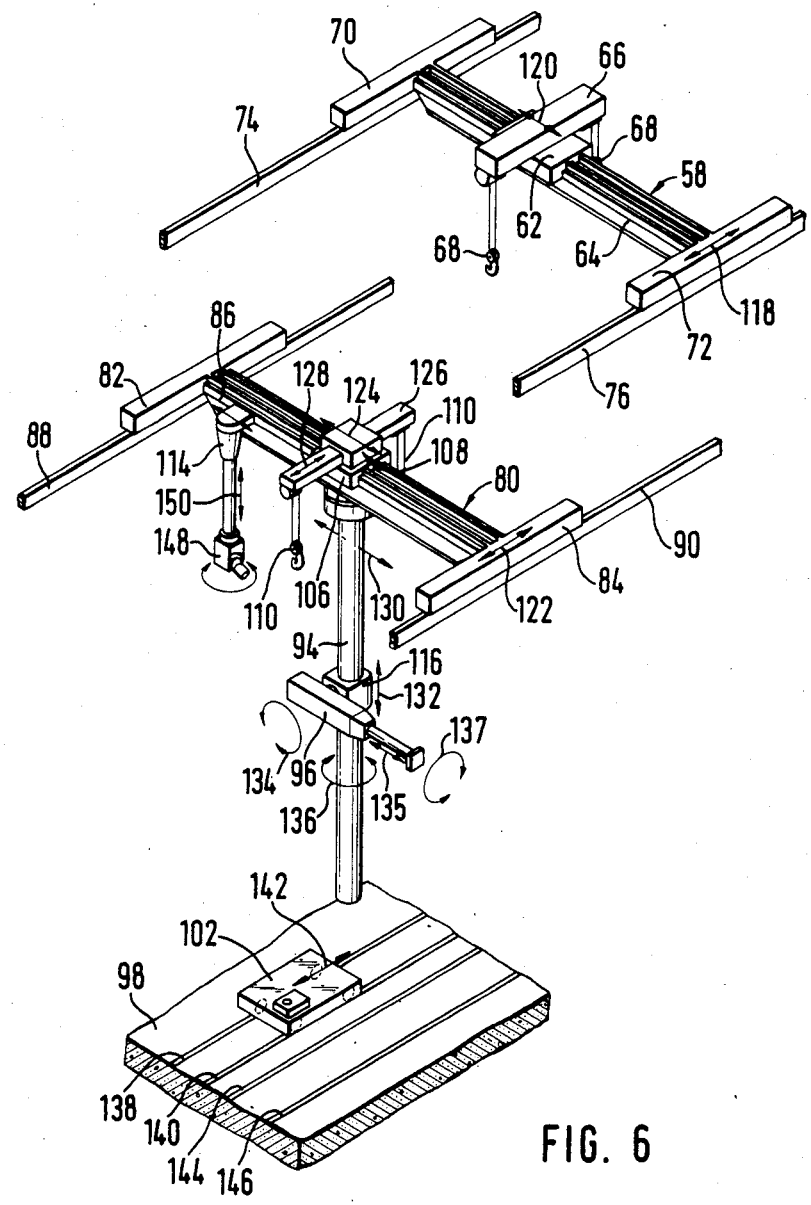
FIG. 6 is a perspective view of the embodiment of FIGS. 4 and 5 and includes vectors showing the movements performed by each component of the system.

FIG. 6 shows the different movements which the components of the system according to the invention can be made to perform.

The first overhead bridge crane 58 can be moved in the direction of the longitudinal axis of the hot cell as shown by arrow 118. The trolley 62 is movable in the direction of arrow 120 along the beam 64 of the bridge crane 58. The block and tackle means 68 can be moved upwardly and downwardly by suitable motors. The second overhead bridge crane 80 can likewise be moved in the direction of the longitudinal axis of the hot cell as shown by arrow 122. The movement of the trolley 106 and hoist assembly 108 mounted on the second overhead bridge crane 80 is indicated by arrow 124 and corresponds to that of the trolley and hoist assembly on the first overhead bridge crane 58. The boom 126 of the hoist assembly 108 can move along its longitudinal axis in a direction parallel to the longitudinal axis of the hot cell as shown by arrow 128.

Arrow 130 indicates that the mast 94 can be moved in the direction of the beam 86 from one side of the hot cell to the other and the support 116 and manipulator means can be moved in the vertical direction up and down the mast as indicated by arrow 132. The extendible arm 96 of the manipulator means can rotate through 360° in a vertical plane as indicated by arrow 134 and the arm 96 is telescopically extendible as indicated by arrow 135. Also, the mast 94 can be rotated about its longitudinal axis as indicated by arrow 136.

On the floor of the hot cell, the trolley 102 can move along rails 138 and 140 embedded in the concrete in the direction indicated by arrow 142. The trolley 104 (FIG. 4) travels on embedded rails 144 and 146.

Monitoring and/or illumination is provided by a telescopic arrangement indicated generally by reference numeral 114. A video camera can, for example, be mounted in the housing 148 and this housing can be raised and lowered with telescopic means in the direction shown by arrow 150.

From FIG. 6, it becomes manifest that the first and second bridge cranes in combination with the equipment mounted thereon enable the block and tackle means of the hoist assemblies 66 and 108 and the manipulator means to reach virtually any point within the hot cell to perform maintenance operations on the process equipment.

A still further advantage of the asymmetrical arrangement of extendible arm 96 on the mast 94 is that the arm 96 and the manipulator 24,25 (FIG. 2) at the outer end thereof can be utilized to perform "self" maintenance work on the bridge crane 80 and the equipment associated therewith. Because the extendible arm 96 is mounted asymmetrically on the mast 94, it can be extended upwardly in a vertical plane so that it clears the elongated beam 86. Thus, by moving the support 116 up the mast to the predetermined elevation and by rotating the arm 96 in the direction of vector 134 to a position where it can be extended upwardly, maintenance work could, for example, be performed on the trolley 106 and/or the hoist assembly 108 associated therewith. In this connection, it is noted that because the mast 94 can be rotated about its longitudinal axis in the direction of vector 136, the extendible arm 96 can reach upwardly from either the left-hand or the right-hand side of the beam 86.

Figure 7:
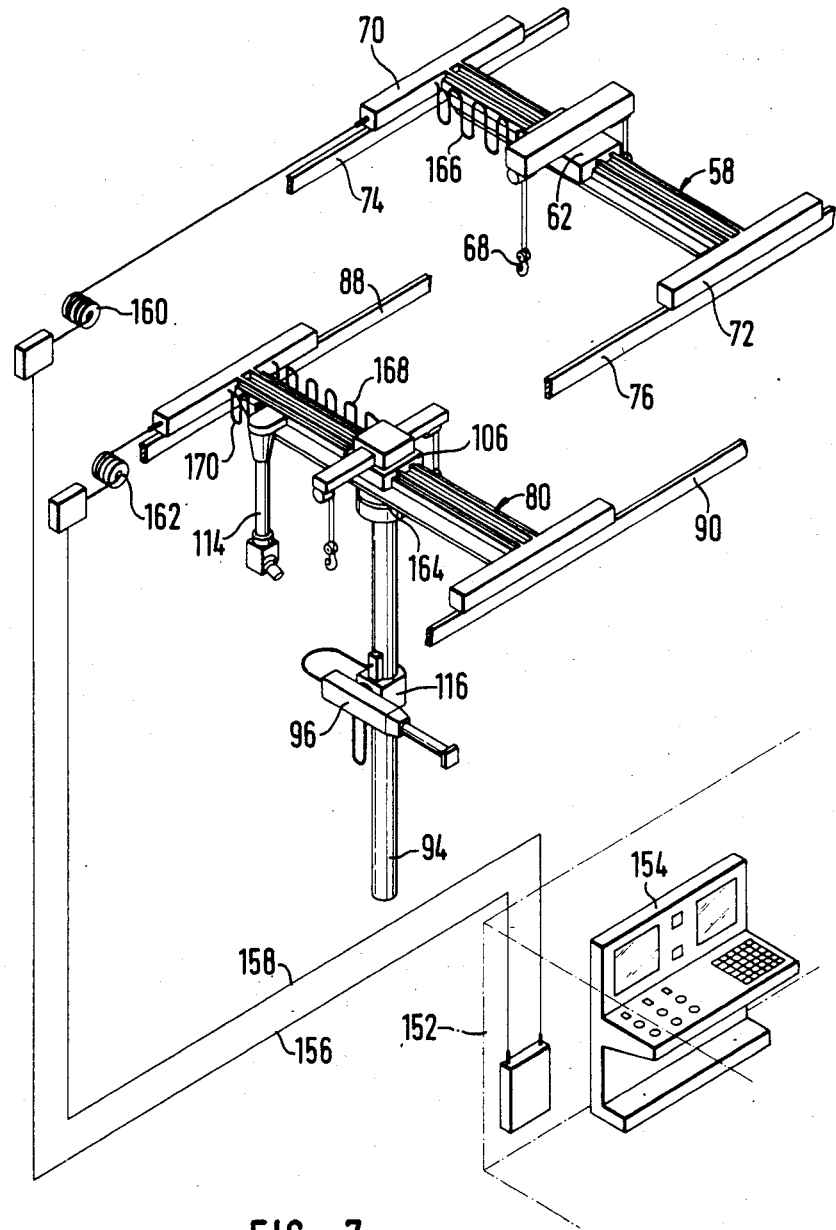
FIG. 7 is a further perspective view of the embodiment of FIGS. 4 and 5 and shows the electrical connections between the components of the system of the invention.

The perspective view of FIG. 7 shows a shielded control housing 152 for operating personnel and a control panel 154. The cables 156 and 158 connect the control panel 154 to the first and second overhead bridge cranes 58 and 80, respectively. The cable 156 is connected to bridge crane 58 via a cable-retracting drum 160 and carries all of the operating leads for the equipment associated with the first overhead bridge crane 58 such as the drive motors for moving the bridge crane along the rails 74 and 76; the drive motors for the trolley 62 for moving the trolley 62 along the beam 64; and, the drive motors for the hoist assembly 66 for raising and lowering the block and tackle means 68. The cable segment 166 conducts the electrical energy from end section 70 to the trolley 62 and collapses and expands in an accordian-like manner as the trolley 62 moves back and forth along beam 64.

The second cable 158 is connected to bridge crane 80 via a cable-retracting drum 162 and carries all the leads for supplying electrical energy to the motors for driving the second bridge crane along the rails 88 and 90. This cable also includes the leads for delivering energy for the motors for operating the trolley 106 and the hoist assembly 108 associated therewith. In addition, the cable 158 carries energy via a slip-ring coupler 164 to the motor for turning the mast 94 about its longitudinal axis and conducts electrical energy via coupler 164 down to the manipulator means for energizing the motor which enables the support 116 to move up and down the mast 94 as well as for energizing the motor of the extendible arm 96 for rotating the same as indicated by arrow 134 (FIG. 6). The electrical energy for telescoping the arm 96 and the manipulator 24 (FIG. 2) at the end thereof is also supplied through the coupler 164.

Cable segment 168 functions with respect to trolley 106 in the same manner as cable 166 for trolley 62. Cable segment 170 likewise folds and expands and conducts electrical energy to the telescopic arrangement 114.

Figure 8:
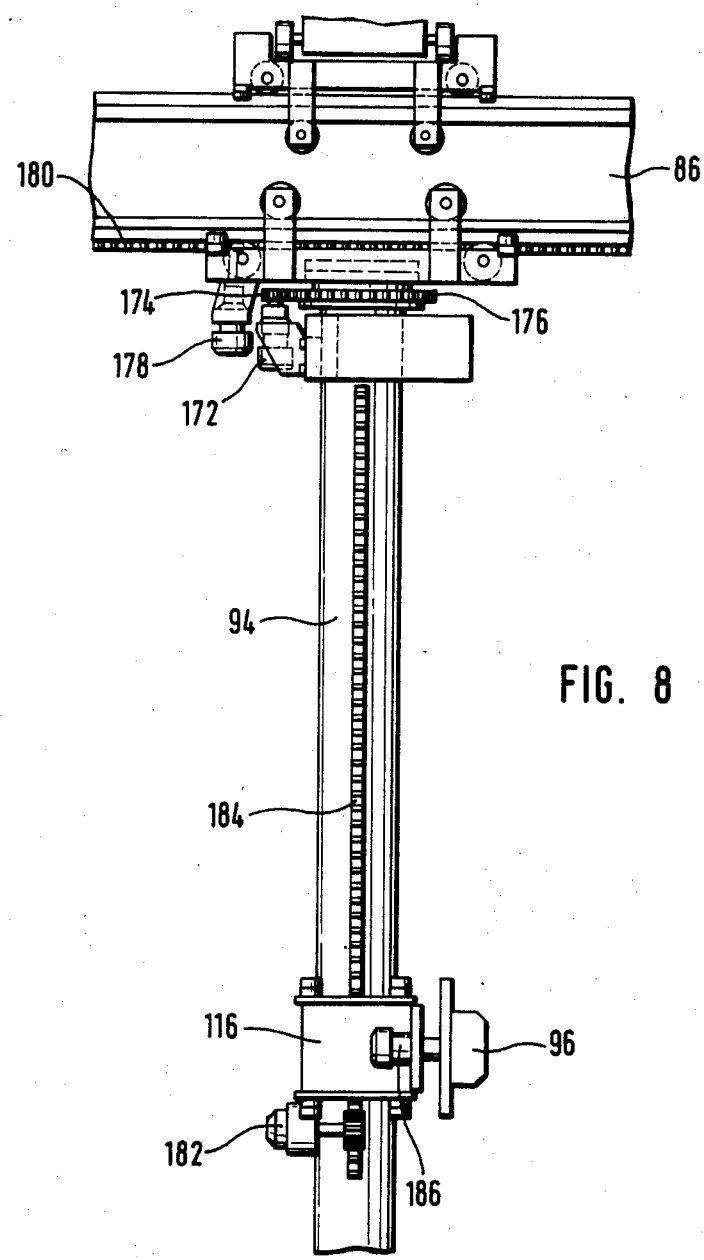
FIG. 8 is an elevation view of a portion of the second overhead bridge crane and of the manipulator assembly showing the drive motors arranged on the mast and on the coupling trolley for coupling the mast to the second overhead bridge crane.

Referring now to FIG. 8, there is shown an elevation view of the mast 94 and the drive motors associated therewith. The drive motor 172 acts via a pinion 174 on a spur gear 176 to rotate the mast 94 about its longitudinal axis; whereas, the motor 178 drives a pinion that engages a linear gear 180 on the beam 86 for moving the mast 94 therealong. The linear gear 180 is a bar containing teeth formed in one face thereof for meshing with the pinion.

The motor 182 is mounted on the support 116 and drives a pinion that engages a linear gear 184 fixedly secured to the mast 94 for moving the support 116 and manipulator means up and down the mast. The motor 186 rotates the arm 96 through 360° in a vertical plane.

Figure 9:
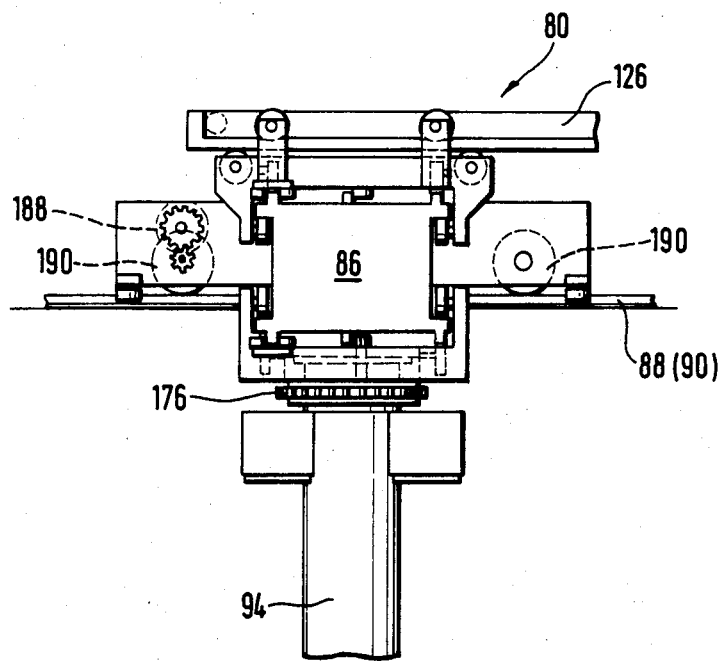
FIG. 9 is a side elevation view of the second overhead bridge crane showing the drive motor thereof for propelling the same along the elevated track.

FIG. 9 is an elevation view which shows the drive motors for the second overhead bridge crane 80. The drive motor 188 drives the wheels 190 and moves the overhead bridge crane 80 along the rails 88 and 90.

It is understood that the foregoing description is that of the preferred embodiments of the invention and that various changes and modifications may be made thereto without departing from the spirit and scope of the invention as defined in the appended claims.

What is claimed is:

1. A system for performing remotely-controlled manual-like operations in a hot cell of a facility for reprocessing irradiated nuclear fuel materials, the hot cell containing process equipment and being an enclosure with the process equipment disposed in racks along at least one longitudinally extending wall thereof whereby a canyon-like passageway is defined which extends in the direction of the longitudinal axis of the enclosure, at least some of the racks accommodating equipment in spatial regions therein which are only accessible from said passageway in a direction perpendicular to said longitudinal axis, the system comprising:

a first overhead bridge crane having a first trolley movable thereon in a direction perpendicular to said longitudinal axis, said trolley including first hoist means for lowering and raising a device for engaging and moving a component of the process equipment in a first vertical plane perpendicular to said axis;

a second overhead crane disposed beneath said first bridge crane and having a second trolley movable thereon in a direction perpendicular to said longitudinal axis, said second trolley including second hoist means for hoisting equipment within the hot cell;

elevated track means for guiding said first and second bridge cranes in said enclosure in respective horizontal planes and in the direction of said longitudinal axis;

said second overhead bridge crane including: an elongated supporting member arranged perpendicularly to said axis and above the passageway and engaging said track means for movement therealong;

a manipulator assembly including: a mast defining a longitudinal mast axis and being connected to said elongated supporting member and extending downwardly into the canyon-like passageway from said supporting member, said supporting member and said mast conjointly defining a second vertical plane perpendicular to said axis;

a support movably mounted on said mast for movement up and down the mast in the direction of said mast axis between a first position at the upper end of said mast and a second position downward of said first position; and, an extendable manipulator arm defining only a single longitudinal arm axis and being extendable only along said arm axis for performing manual-like operations on the process equipment, said manipulator arm being mounted on said support so as to be asymmetrically disposed on one side of said mast and in a third vertical plane perpendicular to said axis; and, means for moving said first bridge crane along said track means to bring said first vertical plane into coincidence with said third vertical plane so as to permit movement of said device in said vertical plane clear of said elongated supporting member and into one of said spatial regions whereby both said manipulator arm and said device can be brought simultaneously to said one spatial region in said third plane for working on process equipment disposed thereat;

first rotating means for rotating said extendable manipulator arm directly on said support so as to permit said arm to clear and extend upwardly beyond said elongated supporting member for performing maintenance work on said second trolley and said second hoist means while said arm is in said third vertical plane; and, second rotating means for rotating said extendable manipulator arm about said mast axis and to bring the same into a fourth vertical plane directly next to said second vertical plane so as to be asymmetrically disposed on the other side of said mast and to permit said arm to clear and extend upwardly beyond said elongated supporting member for performing work on said second trolley and said second hoist means while said arm is in said fourth vertical plane.

2. The system of claim 1, said manipulator arm having a manipulator at the outer end thereof for engaging and performing manual-like operations on a component of the process equipment; and means for moving said manipulator arm up and down said mast.

3. The system of claim 2 wherein said hoist means comprises: a hoist housing mounted on said trolley; a hoist beam mounted in said housing so as to be movable between predetermined limits in the direction of its longitudinal axis, said last-mentioned direction being transverse to said supporting member; and block and tackle means for raising and lowering said device to the process equipment.

4. The system of claim 2, said manipulating means including means on said support for rotating said extendible arm in said second vertical plane.

5. The system of claim 2 comprising: video monitoring means movably mounted on said supporting member for monitoring the movement of said manipulator means.

6. The system of claim 2 wherein said manipulator assembly includes means coupling said mast to said supporting member for movement therealong in said second vertical plane.

* * * * *

UNITED STATES PATENT AND TRADEMARK OFFICE
CERTIFICATE OF CORRECTION

PATENT NO. : 4,664,873

DATED : May 12, 1987

INVENTOR(S) : Klaus Hendrich et al

It is certified that error appears in the above-identified patent and that said Letters Patent is hereby corrected as shown below:

In column 1, line 65: delete "device" and substitute -- devices -- therefor.

In column 2, line 30: delete "ancilliary" and substitute -- ancillary -- therefor.

In column 2, line 40: please add -- nuclear -- after the word "irradiated".

In column 4, line 5: delete "are" and substitute -- and -- therefor.

In column 4, line 26: delete "multipulator" and substitute -- manipulator -- therefor.

UNITED STATES PATENT AND TRADEMARK OFFICE
CERTIFICATE OF CORRECTION

PATENT NO. : 4,664,873

DATED : May 12, 1987

INVENTOR(S) : Klaus Hendrich et al

It is certified that error appears in the above-identified patent and that said Letters Patent is hereby corrected as shown below:

In column 5, line 18: after "bridge crane" second occurrence, please add -- 80 --.

In column 5, line 50: delete "purpose" and substitute -- process -- therefor.

In column 9, line 4: after "said" second occurrence, add -- third --.

In column 9, line 20: delete "and".

Signed and Sealed this

Twenty-seventh Day of October, 1987

Attest:

DONALD J. QUIGG

*Attesting Officer*     *Commissioner of Patents and Trademarks*